United States Patent
Lee et al.

(10) Patent No.: US 11,472,818 B2
(45) Date of Patent: *Oct. 18, 2022

(54) METHOD FOR PREPARING MODIFICATION POLYMERIZATION INITIATOR USING CONTINUOUS TYPE REACTOR

(71) Applicant: LG Chem, Ltd., Seoul (KR)

(72) Inventors: Jung Yong Lee, Daejeon (KR); Dong Cheol Choe, Daejeon (KR); Won Jae Lee, Daejeon (KR); Jae Hoon Choe, Daejeon (KR); Hyeon Hui Kim, Daejeon (KR); Jong Young Choi, Daejeon (KR)

(73) Assignee: LG Chem, Ltd.

( * ) Notice: Subject to any disclaimer, the term of this patent is extended or adjusted under 35 U.S.C. 154(b) by 764 days.

This patent is subject to a terminal disclaimer.

(21) Appl. No.: 16/467,215

(22) PCT Filed: Oct. 12, 2018

(86) PCT No.: PCT/KR2018/012006
§ 371 (c)(1),
(2) Date: Jun. 6, 2019

(87) PCT Pub. No.: WO2019/083203
PCT Pub. Date: May 2, 2019

(65) Prior Publication Data
US 2020/0079797 A1    Mar. 12, 2020

(30) Foreign Application Priority Data

Oct. 23, 2017 (KR) .................... 10-2017-0137558
Oct. 4, 2018 (KR) .................... 10-2018-0118053

(51) Int. Cl.
C07F 1/02 (2006.01)
B01J 4/00 (2006.01)
B01J 19/00 (2006.01)
C07F 1/04 (2006.01)
C08F 2/44 (2006.01)

(52) U.S. Cl.
CPC .............. *C07F 1/02* (2013.01); *B01J 4/008* (2013.01); *B01J 19/0013* (2013.01); *C07F 1/04* (2013.01); *B01J 19/0066* (2013.01); *B01J 2219/00033* (2013.01); *B01J 2219/00051* (2013.01); *B01J 2219/00162* (2013.01); *C08F 2/44* (2013.01)

(58) Field of Classification Search
None
See application file for complete search history.

(56) References Cited

U.S. PATENT DOCUMENTS

| | | | |
|---|---|---|---|
| 5,502,131 A | 3/1996 | Antkowiak et al. | |
| 11,254,801 B2 * | 2/2022 | Lee | C08F 2/44 |
| 2002/0128525 A1 | 9/2002 | Yamada et al. | |
| 2014/0213721 A1 | 7/2014 | Yamada et al. | |
| 2016/0159957 A1 | 6/2016 | Choi et al. | |
| 2018/0056716 A1 | 3/2018 | Lee et al. | |
| 2018/0208684 A1 | 7/2018 | Choe et al. | |

FOREIGN PATENT DOCUMENTS

| | | |
|---|---|---|
| JP | 2006241065 A | 9/2006 |
| JP | 2013108035 A | 6/2013 |
| JP | 2013108037 A | 6/2013 |
| JP | 2014051613 A | 3/2014 |
| JP | 2016527359 A | 9/2016 |
| KR | 20160092227 A | 8/2016 |
| KR | 20170112676 A | 10/2017 |
| WO | 2013035589 A1 | 3/2013 |
| WO | 2017047923 A1 | 3/2017 |
| WO | 2017078408 A1 | 5/2017 |
| WO | 2017115996 A1 | 7/2017 |

OTHER PUBLICATIONS

Chinese Search Report for Application No. 201880004905.2 dated Mar. 30, 2021.
Xu Cheng et al., "Progress of Free Radical Initiators", Zhejiang Chemical Industry, vol. 46, No. 6, Dec. 31, 2015. (Abstract Only).
International Search Report for PCT/KR2018/012006 dated Jan. 17, 2019.

\* cited by examiner

*Primary Examiner* — Joseph R Kosack
(74) *Attorney, Agent, or Firm* — Lerner, David, Littenberg, Krumholz & Mentlik, LLP

(57) ABSTRACT

The present invention relates to a method for preparing a modification polymerization initiator with a high conversion ratio by minimizing side reactions. According to the method for preparing a modification polymerization initiator, a modification polymerization initiator which may easily initiate polymerization and provide a polymer with a functional group having affinity with a filler, may be prepared. Particularly, by performing the method using a continuous reactor, the production of by-products may be decreased, and as a result, the conversion ratio may be increased and a modification polymerization initiator with high purity may be prepared in a high yield.

11 Claims, No Drawings

METHOD FOR PREPARING MODIFICATION POLYMERIZATION INITIATOR USING CONTINUOUS TYPE REACTOR

CROSS-REFERENCE TO RELATED APPLICATIONS

The present application is a national phase entry under 35 U.S.C. § 371 of International Application No. PCT/KR2018/012006 filed Oct. 12, 2018, which claims priority from Korean Patent Application No. 10-2017-0137558 filed Oct. 23, 2017 and Korean Patent Application No. 10-2018-0118053 filed Oct. 4, 2018, all of which are incorporated herein by reference.

TECHNICAL FIELD

The present invention relates to a method for preparing a modification polymerization initiator, by which side reactions are minimized and a modification polymerization initiator may be prepared in a high conversion ratio.

BACKGROUND ART

According to the demand for cars having decreased exhaustion of carbon dioxide ($CO_2$) and a low fuel consumption ratio, and physical properties for tires with high efficiency, eco-friendliness and high performance, a rubber material having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based (co)polymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR (hereinafter, referred to as "SSBR") is used as the rubber material for tires, since glass transition temperature of the rubber is increased by increasing the vinyl content in the SBR, physical properties such as rolling resistance and braking force, required for tires may be controlled, and fuel consumption may also be reduced by appropriately adjusting the glass transition temperature.

The SSBR is prepared by using an anionic polymerization initiator and is being used by coupling or modifying the chain terminals of the polymer thus formed using various modifiers. Recently, the development of modification in a polymerization step using a modification polymerization initiator, a modification monomer, etc. during polymerization is conducted.

For example, as a modification polymerization initiator used for preparing SSBR, a hexamethylene lithium initiator prepared by the reaction of hexamethyleneimine (HMI) and n-butyllithium (BuLi) by the following Reaction 1 is widely known:

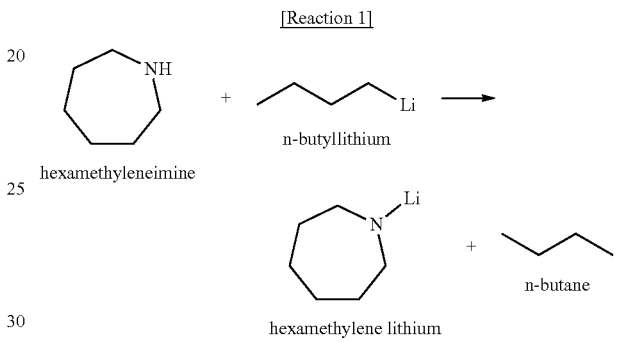

[Reaction 1]

However, the solubility of the hexamethylene lithium initiator in a solvent is low, and precipitation is produced over time, and in this case, the hexamethylene lithium initiator may be used as the polymerization initiator but the reactivity thereof is not good in contrast to n-butyllithium. In addition, in order to compensate the defects of the hexamethylene lithium initiator, a method for preparing a modification polymerization initiator by further reacting a conjugated diene compound such as isoprene and 1,3-butadiene with the hexamethylene lithium prepared through Reaction 1, by the following Reaction 2, has been suggested:

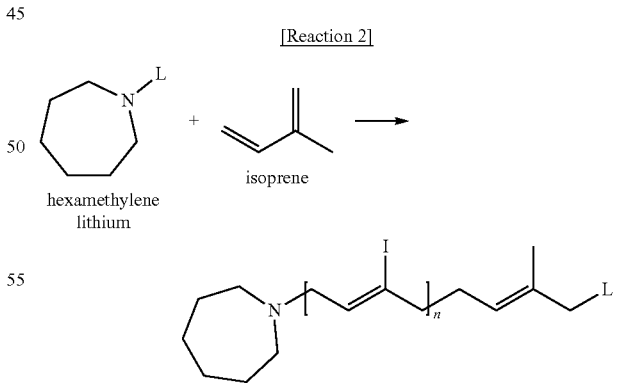

[Reaction 2]

However, though the modification polymerization initiator thus prepared has improved solubility and reactivity in contrast to the hexamethylene lithium initiator, precipitation still takes place over time and deactivation is induced.

Meanwhile, generally, an anionic polymerization initiator such as the above-mentioned modification polymerization initiator may be prepared through a batch type process, or an anionic polymerization initiator and SSBR may be prepared simultaneously in one batch type reactor. In the former, the anionic polymerization initiator thus prepared essentially requires a storing step prior to use for the preparation of SSBR, and during storing, the activity thereof may be lost via the reaction with diverse scavengers such as humidity and air. As a result, post processes may be adversely influenced to act as a factor degrading the physical properties of a finally prepared SSBR. In the latter, the preparing reaction of the anionic polymerization initiator and the SSBR polymerization reaction are performed in the same batch type reactor, and defects relating to storage may be solved, but the checking of the proper synthesis of the anionic polymerization initiator is difficult and the physical properties of the finally prepared SSBR may be worse than a case where an anionic polymerization initiator synthesized in advance is used. Further, in the conventional batch type process, raw materials are directly included, and by-products may be produced during mixing reaction, or reverse reaction may be carried out to produce unreacted materials, thereby decreasing yield.

Accordingly, recently, in order to solve the defects of the batch type reactor, a method using a continuous type reactor has been studied.

For example, Korean Laid-open Patent Publication No. 10-2016-0092227 discloses a method for preparing an anionic polymerization initiator using a continuous type reactor including a static mixer. According to the method, the concentration distribution or temperature distribution of raw materials may be controlled uniformly, and lithiation reaction may be continuously carried out, and storage problem and yield decreasing problem may be decreased. However, due to the static mixer, the exothermic reaction defect of the lithiation reaction is not solved, and a specific cooling apparatus is required and manufacturing cost is high.

DISCLOSURE OF THE INVENTION

Technical Problem

The present invention has been devised to solve the above-mentioned problems of the conventional technique, and an object of the present invention is to provide a modification polymerization initiator, which may be used in a polymerization reaction to easily initiate polymerization and provide a polymer with a functional group having affinity with a filler, and a method for preparing a modification polymerization initiator in a high conversion ratio by minimizing side reactions.

Technical Solution

To solve the above-described tasks, there is provided in the present invention a method for preparing a modification polymerization initiator including a step of reacting a compound represented by the following Formula 1 and a compound represented by the following Formula 2, wherein the reaction is performed in a continuous reactor including a first continuous channel and a second continuous channel, and prior to performing the reaction, the compound represented by Formula 1 is injected into the continuous reactor via the first continuous channel and the compound represented by Formula 2 is injected into the continuous reactor via the second continuous channel:

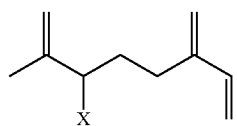

[Formula 1]

in Formula 1,

X is $-NR_aR_b$, $-OR_c$, or $-SR_d$, and $R_a$ to $R_d$ are each independently an alkyl group of 1 to 30 carbon atoms, an alkenyl group of 2 to 30 carbon atoms, an alkynyl group of 2 to 30 carbon atoms, a cycloalkyl group of 3 to 30 carbon atoms, an aryl group of 6 to 30 carbon atoms, a heteroalkyl group of 1 to 30 carbon atoms, a heteroalkenyl group of 2 to 30 carbon atoms, a heteroalkynyl group of 2 to 30 carbon atoms, a heterocycloalkyl group of 2 to 30 carbon atoms, or a heteroaryl group of 3 to 30 carbon atoms, where each of $R_a$ to $R_d$ is unsubstituted or substituted with a substituent including one or more heteroatoms selected from N, O, S, Si and F atoms, and $R_a$ and $R_b$ may be connected with each other to form an aliphatic hydrocarbon ring of 5 to carbon atoms, an aromatic hydrocarbon ring of 6 to 20 carbon atoms, or a heterocycle of 3 to 20 carbon atoms, which are unsubstituted or substituted with an alkyl group of 1 to 30 carbon atoms, $$M-R_1 \qquad \text{[Formula 2]}$$

in Formula 2,

M is an alkali metal, and $R_1$ is hydrogen, an alkyl group of 1 to 30 carbon atoms, an alkenyl group of 2 to 30 carbon atoms, an alkynyl group of 2 to 30 carbon atoms, a cycloalkyl group of 5 to 30 carbon atoms, or an aryl group of 6 to 30 carbon atoms.

Advantageous Effects

According to the method for preparing a modification polymerization initiator according to the present invention, a modification polymerization initiator which may be used in polymerization reaction to easily initiate polymerization and may provide a polymer with a functional group having affinity with a filler, may be easily prepared.

In addition, the method for preparing a modification polymerization initiator according to the present invention is particularly performed using a continuous reactor, and may decrease the production of unreacted material during lithiation reaction, and decrease defects due to the exothermic reaction of the lithiation reaction by rapid heat removal, thereby reducing the production of by-products and as a result, increasing a conversion ratio to prepare a modification polymerization initiator with high purity in high yield.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "substituted" used in the present invention may mean the hydrogen of a functional group, an atomic group or a compound is substituted with a specific substituent. If the hydrogen of a functional group, an atomic group or a compound is substituted with a specific substituent, one or a plurality including two or more substituents may be present according to the number of hydrogen atoms present in the functional group, the atomic group or the compound, and if a plurality of substituents are present, each substituent may be the same or different.

The term "alkyl group" used in the present invention may mean monovalent aliphatic saturated hydrocarbon, and may include both linear alkyl groups such as methyl, ethyl, propyl and butyl, and branched alkyl groups such as isopropyl, sec-butyl, tert-butyl and neo-pentyl.

The term "alkylene group" used in the present invention may mean divalent aliphatic saturated hydrocarbon such as methylene, ethylene, propylene and butylene.

The term "alkenyl group" used in the present invention may mean an alkyl group including one or two or more double bonds.

The term "alkynyl group" used in the present invention may mean an alkyl group including one or two or more triple bonds.

The term "cycloalkyl group" used in the present invention may mean cyclic saturated hydrocarbon.

The term "aryl group" used in the present invention may mean cyclic aromatic hydrocarbon, and may include both monocyclic aromatic hydrocarbon including one ring, and polycyclic aromatic hydrocarbon including two or more rings combined.

The term "heteroalkyl group" used in the present invention may mean an alkyl group, in which a carbon atom (excluding a terminal carbon atom) in the alkyl group is substituted with one or more heteroatoms.

The term "heteroalkenyl group" used in the present invention may mean an alkenyl group, in which a carbon atom (excluding a terminal carbon atom) in the alkenyl group is substituted with one or more heteroatoms.

The term "heteroalkynyl group" used in the present invention may mean an alkynyl group, in which a carbon atom (excluding a terminal carbon atom) in the alkynyl group is substituted with one or more heteroatoms.

The term "heterocycloalkyl group" used in the present invention may mean a cycloalkyl group, in which a carbon atom in the cycloalkyl group is substituted with one or more heteroatoms.

The term "heteroaryl group" used in the present invention may mean a aryl group, in which a carbon atom in the aryl group is substituted with one or more heteroatoms.

The term "derived unit" and "derived functional group" used in the present invention may represent a component or a structure comes from a certain material, or the material itself.

The present invention provides a method for preparing a modification polymerization initiator, by which a modification polymerization initiator that may act as a polymerization initiator during polymerizing a polymer, particularly, a conjugated diene-based polymer, and may provide the polymer with a functional group such as a group having affinity with a filler, may be easily prepared.

The method for preparing a modification polymerization initiator according to an embodiment of the present invention is characterized in including a step of reacting a compound represented by the following Formula 1 and a compound represented by the following Formula 2 (step A), wherein the reaction is performed in a continuous reactor including a first continuous channel and a second continuous channel, and prior to performing the reaction, the compound represented by Formula 1 is injected into the continuous reactor via the first continuous channel and the compound represented by Formula 2 is injected into the continuous reactor via the second continuous channel:

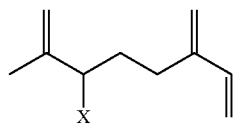

[Formula 1]

in Formula 1,

X is $-NR_aR_b$, $-OR_c$, or $-SR_d$, and $R_a$ to $R_d$ are each independently an alkyl group of 1 to 30 carbon atoms, an alkenyl group of 2 to 30 carbon atoms, an alkynyl group of 2 to 30 carbon atoms, a cycloalkyl group of 3 to 30 carbon atoms, an aryl group of 6 to 30 carbon atoms, a heteroalkyl group of 1 to 30 carbon atoms, a heteroalkenyl group of 2 to 30 carbon atoms, a heteroalkynyl group of 2 to 30 carbon atoms, a heterocycloalkyl group of 2 to 30 carbon atoms, or a heteroaryl group of 3 to 30 carbon atoms, where each of $R_a$ to $R_d$ is unsubstituted or substituted with a substituent including one or more heteroatoms selected from N, O, S, Si and F atoms, and $R_a$ and $R_b$ may be connected with each other to form an aliphatic hydrocarbon ring of 5 to 20 carbon atoms, an aromatic hydrocarbon ring of 6 to 20 carbon atoms, or a heterocycle of 3 to 20 carbon atoms, which are unsubstituted or substituted with an alkyl group of 1 to 30 carbon atoms, $$M-R_1 \quad \text{[Formula 2]}$$

in Formula 2,

M is an alkali metal, and $R_1$ is hydrogen, an alkyl group of 1 to 30 carbon atoms, an alkenyl group of 2 to 30 carbon atoms, an alkynyl group of 2 to 30 carbon atoms, a cycloalkyl group of 5 to 30 carbon atoms, or an aryl group of 6 to 30 carbon atoms.

Particularly, in Formula 1, X is $-NR_aR_b$, $-OR_c$, or $-SR_d$, where $R_a$ to $R_d$ are each independently an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, a heteroalkyl group of 1 to 20 carbon atoms, a heteroalkenyl group of 2 to 20 carbon atoms, a heteroalkynyl group of 2 to 20 carbon atoms, a heterocycloalkyl group of 2 to 20 carbon atoms, or a heteroaryl group of 3 to 20 carbon atoms, where each of $R_a$ to $R_d$ is unsubstituted or substituted with a substituent including one or more heteroatoms selected from N, O, S, Si and F atoms, and $R_a$ and $R_b$ may be connected with each other to form an aliphatic hydrocarbon ring of 5 to 20 carbon atoms, an aromatic hydrocarbon ring of 6 to 20 carbon atoms, or a heterocycle of 3 to 20 carbon atoms, which are unsubstituted or substituted with an alkyl group of 1 to 20 carbon atoms.

In addition, more particularly, in Formula 1, X may be one selected from the substituents represented by the following Formula 1a to Formula 1c:

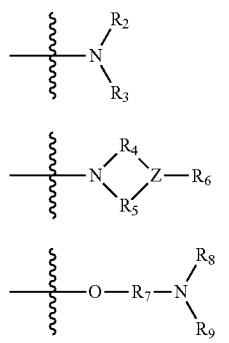

[Formula 1a]
[Formula 1b]
[Formula 1c]

in Formula 1a to Formula 1c, $R_2$, $R_3$, $R_6$, $R_8$ and $R_9$ are each independently an alkyl group of 1 to 10 carbon atoms, an alkenyl group of 2 to 10 carbon atoms, an alkynyl group of 2 to 10 carbon atoms, a cycloalkyl group of 3 to 10 carbon atoms, an aryl group of 6 to 10 carbon atoms, a heteroalkyl group of 1 to 10 carbon atoms, a heteroalkenyl group of 2 to 10 carbon atoms, a heteroalkynyl group of 2 to 10 carbon atoms, a heterocycloalkyl group of 3 to 10 carbon atoms, or a heteroaryl group of 3 to 10 carbon atoms, where $R_2$ and $R_3$, and $R_8$ and $R_9$ each may be connected with each other to form an aliphatic hydrocarbon ring of 5 to 20 carbon atoms, or an aromatic hydrocarbon ring of 6 to 20 carbon atoms, and each of $R_2$, $R_3$, $R_6$, $R_8$ and $R_9$ is unsubstituted or substituted with a substituent including one or more heteroatoms selected from N, O and S atoms, $R_4$, $R_5$ and $R_7$ are each independently an alkylene group of 1 to 10 carbon atoms, where the alkylene group is unsubstituted or substituted with an alkyl group of 1 to 10 carbon atoms, a cycloalkyl group of 5 to 10 carbon atoms, an aryl group of 6 to 10 carbon atoms, a heteroatom selected from N and O atoms or with a substituent including the heteroatom, and Z is one selected from N, O and S atoms, where if Z is O or S, $R_6$ is not present.

More particularly, the compound represented by Formula 1 may be a compound represented by the following Formula 1-1 to Formula 1-11:

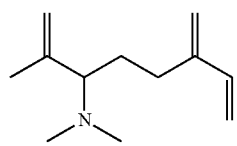

[Formula 1-1]

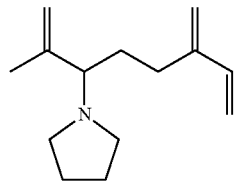

[Formula 1-2]

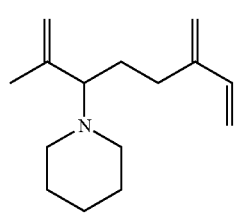

[Formula 1-3]

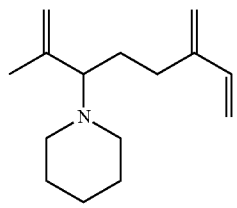

[Formula 1-4]

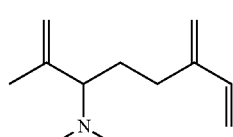

[Formula 1-5]

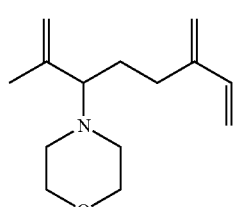

[Formula 1-6]

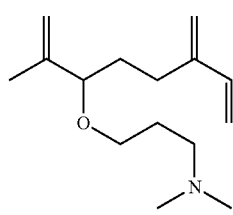

[Formula 1-7]

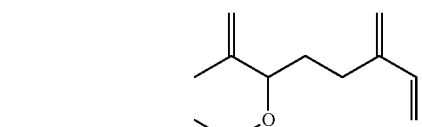

[Formula 1-8]

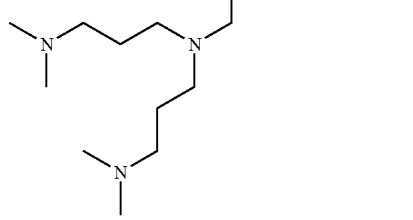

[Formula 1-9]

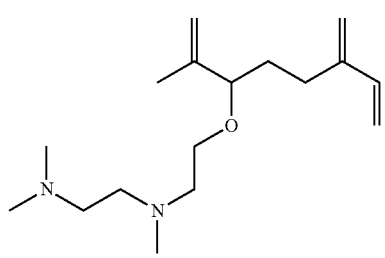

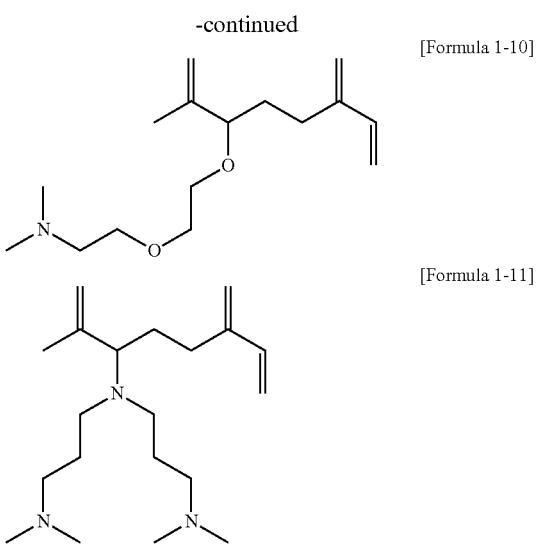

[Formula 1-10]

[Formula 1-11]

In addition, in Formula 2, M is an alkali metal, $R_1$ may be hydrogen, an alkyl group of 1 to 10 carbon atoms, an alkenyl group of 2 to 10 carbon atoms, an alkynyl group of 2 to 10 carbon atoms, a cycloalkyl group of 5 to 10 carbon atoms, or an aryl group of 6 to 10 carbon atoms.

Meanwhile, the compound represented by Formula 1 according to an embodiment of the present invention may be prepared by reacting myrcene with a functional group compound. For example, as in Reaction 3 below, myrcene is reacted with a reactive compound to form a reactive site in the molecular structure of the myrcene, and then reacted with a functional group compound to form the compound represented by Formula 1, obtained by introducing a functional group derived from the functional group compound to the reactive site.

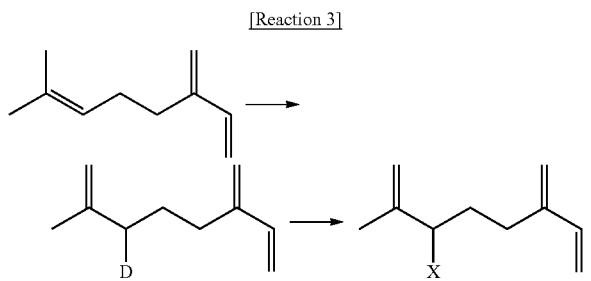

[Reaction 3]

In Reaction 3, D may be Cl, Br, I or —OH, and X is the same as defined in Formula 1.

In an embodiment of the present invention, the reaction in step A may be performed in a continuous reactor. In this case, the continuous reactor may represent a reactor for performing reaction while continuously injecting raw materials used for the reaction.

Particularly, the reaction in step A may be performed in a continuous reactor including a first continuous channel and a second continuous channel, and in this case, prior to performing reaction, the compound represented by Formula 1 may be injected via the first continuous channel and the compound represented by Formula 2 may be injected via the second continuous channel to the continuous reactor. Here, each of the first continuous channel and the second continuous channel may mean an injecting part (or inserting part) for controlling the injecting amount of each compound into the continuous reactor, and in this case, the injecting amounts of the compound represented by Formula 1 and the compound represented by Formula 2 may be each independently controlled, and each injecting amount may be controlled according to reaction environment, thereby minimizing the occurrence of side reactions.

Meanwhile, the injection rate of the first continuous channel may be from 0.1 g/min to 1,000 g/min, from 0.1 g/min to 700 g/min, or 0.1 g/min to 400 g/min, and the injection rate of the second continuous channel may be from 0.1 g/min to 1,000 g/min, from 0.1 g/min to 700 g/min or from 0.1 g/min to 400 g/min. Within these ranges, the injecting amounts of the compound represented by Formula 1 and the compound represented by Formula 2 may be appropriately controlled without rapid change, and the side reactions may be minimized.

In addition, during the reaction in step A, the molar ratio of the compound represented by Formula 1 and the compound represented by Formula 2 may be 1:0.01 to 5, 1:0.1 to 5, 1:0.5 to 3, or 1:0.5 to 1.5, and within this range, the side reactions may be minimized. In this case, according to the molar ratio of the compound represented by Formula 1 and the compound represented by Formula 2, the modification polymerization initiator thus prepared may have a dimer, a trimer or an oligomer type.

Meanwhile, the compound represented by Formula 1 and the compound represented by Formula 2 may be dissolved in reaction solvents, respectively, and may be used as a solution state, as necessary. If the compound represented by Formula 1 and the compound represented by Formula 2 are used in solution state, the concentrations of the solutions are not specifically limited, and the compound represented by Formula 1 and the compound represented by Formula 2 may be used by controlling the molar ratio thereof within the above-mentioned molar ratio.

Here, the reaction solvent may be a hydrocarbon solvent which does not react with anions, for example, one or more selected among a linear hydrocarbon compound such as pentane, hexane and octane; its derivatives having branches; a cyclic hydrocarbon compound such as cyclohexane and cycloheptane; an aromatic hydrocarbon compound such as benzene, toluene and xylene; and linear or cyclic ethers such as dimethyl ether, diethyl ether, anisole and tetrahydrofuran. Particularly, the reaction solvent may be cyclohexane, hexane, tetrahydrofuran or diethyl ether.

In addition, according to an embodiment of the present invention, the reaction in step A may be performed in a temperature range of −20° C. to 100° C., 0° C. to 90° C., or 15° C. to 80° C. under pressure conditions of 1 bar to 10 bar, 1 bar to 7 bar or 1 bar to 5 bar. Within these ranges, the side reactions may be minimized.

The method for preparing a modification polymerization initiator according to the present invention is performed using a continuous reactor, and the mixing ratio of the reaction raw materials during lithiation reaction (for example, the compound represented by Formula 1 and the compound represented by Formula 2) is increased to decrease the production of unreacted materials and decrease defects due to the exothermic reaction of the lithiation reaction through rapid heat removal, thereby decreasing the production of by-products. As a result, a conversion ratio may be increased and a modification polymerization initiator having high purity may be stably prepared in high yield.

Meanwhile the reaction in step A may be performed by further adding a polar additive. The polar additive may include one or more selected from the group consisting of tetrahydrofuran, ditetrahydrofurylpropane, diethyl ether, cycloamyl ether, dipropyl ether, ethylene dimethyl ether, ethylene diethyl ether, diethyl glycol, dimethyl ether, tert-butoxyethoxyethane, bis(3-dimethylaminoethyl) ether, (dimethylaminoethyl) ethyl ether, trimethylamine, triethylamine, tripropylamine, and tetramethylethylenediamine, particularly, triethylamine or tetramethylethylenediamine.

In addition, if the reaction is performed using the polar additive, the polar additive may be used in an amount of 0.1 mol to 10 mol, 0.5 mol to 5 mol, or 0.5 mol to 1.5 mol based on 1 mol of the compound represented by Formula 1.

In addition, the present invention provides a modification polymerization initiator prepared by the method for preparing a modification polymerization initiator.

The modification polymerization initiator according to an embodiment of the present invention is characterized in including a derived from the compound represented by Formula 1 and a derived unit from the compound represented by Formula 2.

In addition, the modification polymerization initiator may be one material or a mixture type of various materials.

Particularly, the modification polymerization initiator may include one or more selected among a compound represented by Formula 3 and the isomers thereof.

In addition, the modification polymerization initiator may include one or more selected from the dimer, the trimer or the oligomer of a compound represented by Formula 3 below, and the dimer, the trimer or the oligomer of the isomers of the compound represented by Formula 3.

In addition, the modification polymerization initiator according may include as another embodiment, one or more selected from a compound represented by Formula 3; the isomers thereof; one or more selected from the dimer, the trimer and the oligomer thereof; and one or more selected from the dimer, the trimer or the oligomer of the isomers.

[Formula 3]

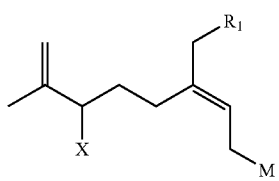

in Formula 3,

X is the same as defined in Formula 1, M is Na, K or Li, and R$_1$ is hydrogen or an alkyl group of 1 to 10 carbon atoms. In addition, in Formula 3, M may be bonded to a neighboring carbon atom via an ionic bond.

Meanwhile, the isomers of the compound represented by Formula 3 may include both the structure isomers and the stereoisomers of the compound represented by Formula 3, for example, may be one or more selected from the compounds represented in the following Formula 3-1 to Formula 3-3:

[Formula 3-1]

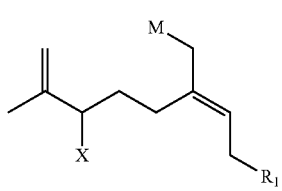

[Formula 3-2]

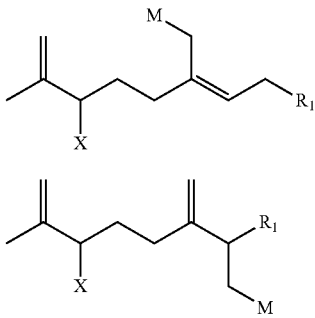

[Formula 3-3]

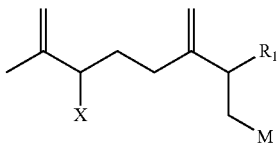

in Formula 3-1 to Formula 3-3,

X is the same as defined in Formula 1, M is Na, K or Li, and R$_1$ is hydrogen or an alkyl group of 1 to 10 carbon atoms. In addition, in Formula 3-1 to Formula 3-3, M may be bonded to a neighboring carbon atom via an ionic bond.

More particularly, in Formula 3 and Formula 3-1 to Formula 3-3, X may be selected from the substituents represented by Formula 1a to Formula 1c, where R$_2$, R$_3$, R$_6$, R$_8$ and R$_9$ are each independently an alkyl group of 1 to 10 carbon atoms, which is unsubstituted or substituted with one or more heteroatoms selected from N, O and S atoms or with a substituent including the heteroatom, R$_4$, R$_5$ and R$_7$ are each independently an alkylene group of 1 to 6 carbon atoms, which is unsubstituted or substituted with a heteroatom selected from N and O atoms or with a substituent including the heteroatom, and Z may be O.

In addition, the compound represented by Formula 3 includes a unit derived from the compound represented by Formula 1 and a unit derived from the compound represented by Formula 2. The dimer may represent a combined type of two units derived from the compound represented by Formula 1 and one unit derived from the compound represented by Formula 2, and the trimer may represent a combined type of three units derived from the compound represented by Formula 1 and one unit derived from the compound represented by Formula 2. In addition, the oligomer may represent a combined type of a plurality of the units derived from the compound represented by Formula 1 and one unit derived from the compound represented by Formula 2.

For example, the dimer of the compound represented by Formula 3 may be a compound represented by the following Formula 3-4:

[Formula 3-4]

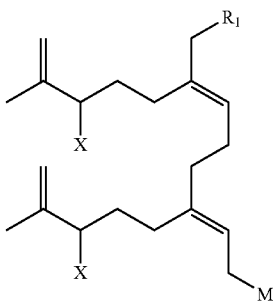

Also, the present invention provides a modified conjugated diene-based polymer including a functional group derived from the modification polymerization initiator.

The modified conjugated diene-based polymer according to an embodiment of the present invention is characterized in including a repeating unit derived from a conjugated diene-based monomer, and a functional group derived from the modification polymerization initiator including the derived unit from the compound represented by Formula 1 in at least one terminal.

The repeating unit derived from the conjugated diene-based monomer may mean a repeating unit formed by the polymerization of the conjugated diene-based monomer, and the conjugated diene-based monomer may be, for example, one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (here, halo means a halogen atom).

Meanwhile, the modified conjugated diene-based copolymer may be, for example, a copolymer further including a repeating unit derived from an aromatic vinyl monomer together with the repeating unit derived from the conjugated diene-based monomer.

The repeating unit derived from the aromatic vinyl monomer may mean a repeating unit formed by an aromatic vinyl monomer during polymerization, and the aromatic vinyl monomer may include, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, and 1-vinyl-5-hexylnaphthalene.

According to an embodiment of the present invention, the copolymer may be a random copolymer, and in this case, the balance among each of the physical properties is excellent. The random copolymer may mean a copolymer of which constituting repeating units are arranged in disorder.

Meanwhile, the modified conjugated diene-based polymer in an embodiment of the present invention may be prepared by a preparation method including a step of preparing an active polymer combined with an alkali metal by polymerizing a conjugated diene-based monomer, or a conjugated diene-based monomer and an aromatic vinyl monomer in the presence of the modification polymerization initiator including a derived unit from the compound represented by Formula 1 and a unit derived from the compound represented by Formula 2, in a hydrocarbon solvent.

The hydrocarbon solvent is not specifically limited, but may be, for example, one or more selected from the group consisting of n-pentane, n-hexane, n-heptane, isooctane, cyclohexane, toluene, benzene and xylene.

The conjugated diene-based monomer and the aromatic vinyl monomer are the same as defined above.

The polymerization may be performed by including a polar additive, and the polar additive may be added in an amount of 0.001 g to 50 g, 0.001 g to 10 g, or 0.005 g to 0.1 g based on total 100 g of the monomer. In addition, the polar additive may be one or more selected from the group consisting of tetrahydrofuran, ditetrahydrofurylpropane, diethyl ether, cycloamyl ether, dipropyl ether, ethylene dimethyl ether, diethyl glycol, dimethyl ether, tert-butoxyethoxyethane, bis(3-dimethylaminoethyl) ether, (dimethylaminoethyl) ethyl ether, trimethylamine, triethylamine, tripropylamine, and tetramethylethylenediamine, particularly, triethylamine or tetramethylethylenediamine, and may be the same as or different from the polar additive which may be used for preparing the modification polymerization initiator. If the polar additive is included and a conjugated diene-based monomer, or a conjugated diene-based monomer and an aromatic vinyl-based monomer are copolymerized, the difference of the reaction rates thereof may be compensated, and effect of inducing the easy formation of a random copolymer may be achieved.

The polymerization may be, for example, an anionic polymerization, and particularly, a living anionic polymerization by which an anionic active part is formed at the polymer terminal through a propagation reaction by anions. In addition, the polymerization may be a polymerization with heating, an isothermal polymerization, or a polymerization at a constant temperature (adiabatic polymerization). The polymerization at a constant temperature means a polymerization method including a step of polymerizing using self-generated heat of reaction without optionally applying heat after adding an organometal compound, and the polymerization with heating means a polymerization method including injecting the organometal compound and then, increasing the temperature by optionally applying heat. The isothermal polymerization means a polymerization method by which the temperature of a polymer is kept constant by increasing heat by applying heat or taking heat after adding the organometal compound.

In addition, the polymerization may be performed in a temperature range of −20° C. to 200° C., 0° C. to 150° C., or 10° C. to 120° C.

In addition, the modified conjugated diene-based polymer may be prepared by a batch type polymerization method or a continuous type polymerization method including one or more reactors.

Hereinafter, the present invention will be explained in more detail referring to embodiments. However, the following embodiments are only for the illustration of the present invention, and the scope of the present invention is not limited thereto.

Example 1

Two of 2 L, vacuum dried stainless steel pressure containers were prepared. To the first pressure container, 1822 g of hexane, 250 g of a compound represented by Formula 1-1 below, and 162 g of tetramethylethylenediamine were injected to prepare a first reaction solution. At the same time, to the second pressure container, 385 g of 2.5 M n-butyllithium (in hexane) in a liquid phase and 1845 g of hexane were injected to prepare a second reaction solution. In this case, the molar ratio of the compound represented by Formula 1-1, n-butyllithium and tetramethylethylenediamine was 1:1:1. The pressure of each pressure container was kept to 5 bar, and the first reaction solution was injected via a first continuous channel in an injection rate of 1.0 g/min and the second reaction solution was injected via a second continuous channel in an injection rate of 1.0 g/min, respectively, into a continuous reactor using a mass flowmeter. In this case, the temperature of the continuous reactor was kept to 25° C., and the internal pressure was kept to 2 bar using a backpressure regulator. After finishing the reaction, the synthesis of the modification polymerization initiator was secured by the change of the molecular weights of the compound represented by Formula 1-1 and the finally obtained material by molecular analysis. The molecular weight of the compound represented by Formula 1-1 was 179 g/mol, and the molecular weight of the finally obtained material, i.e., the modification polymerization initiator was 237 g/mol. In this case, the molecular weight of the modification polymerization initiator represented the molecular weight obtained by substituting Li with H.

Particularly, the molecular weight analysis was conducted by GC/Mass analysis. In this case, a column used was ZB-5MS (0.25 mm (ID)×30 ml, 0.25 μm d.f. capillary), a gas flow rate (column (He)) was 1 ml/min, the temperature of an oven was elevated after 3 minutes from an initial temperature of 50° C. by 10° C./min rate to 320° C. and was kept for 15 minutes, the temperature of an inlet was 250° C., a split ratio was 1/20, and an injection amount was controlled to 0.2 µl. In addition, the measurement was conducted after protonating the organolithium part of the modification polymerization initiator by quenching.

[Formula 1-1]

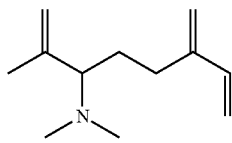

Example 2

Two of 2 L, vacuum dried stainless steel pressure containers were prepared. To the first pressure container, 1900 g of hexane, 250 g of a compound represented by Formula 1-5 below, and 124 g of tetramethylethylenediamine were injected to prepare a first reaction solution. At the same time, to the second pressure container, 385 g of 2.5 M n-butyllithium (in hexane) in a liquid phase and 2600 g of hexane were injected to prepare a second reaction solution. In this case, the molar ratio of the compound represented by Formula 1-5, n-butyllithium and tetramethylethylenediamine was 1:1:1. The pressure of each pressure container was kept to 5 bar, and the first reaction solution was injected via a first continuous channel in an injection rate of 1.0 g/min and the second reaction solution was injected via a second continuous channel in an injection rate of 1.0 g/min, respectively, into a continuous reactor using a mass flowmeter. In this case, the temperature of the continuous reactor was kept to 40° C., and the internal pressure was kept to 2 bar using a backpressure regulator. After finishing the reaction, the synthesis of the modification polymerization initiator was secured by the change of the molecular weights of the compound represented by Formula 1-5 and the finally obtained material by molecular analysis. The molecular weight of the compound represented by Formula 1-5 was 234 g/mol, and the molecular weight of the finally obtained material, i.e., the modification polymerization initiator was 292 g/mol. In this case, the molecular weight of the modification polymerization initiator represented the molecular weight obtained by substituting Li with H. The molecular weight analysis was conducted by the same method as in Example 1.

[Formula 1-5]

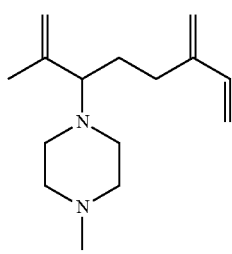

Example 3

Two of 2 L, vacuum dried stainless steel pressure containers were prepared. To the first pressure container, 1900 g of hexane, 344 g of a compound represented by Formula 1-11 below, and 124 g of tetramethylethylenediamine were injected to prepare a first reaction solution. At the same time, to the second pressure container, 370 g of 2.5 M n-butyllithium (in hexane) in a liquid phase and 2600 g of hexane were injected to prepare a second reaction solution. In this case, the molar ratio of the compound represented by Formula 1-11, n-butyllithium and tetramethylethylenediamine was 1:1:1. The pressure of each pressure container was kept to 5 bar, and the first reaction solution was injected via a first continuous channel in an injection rate of 1.0 g/min and the second reaction solution was injected via a second continuous channel in an injection rate of 1.0 g/min, respectively, into a continuous reactor using a mass flowmeter. In this case, the temperature of the continuous reactor was kept to 40° C., and the internal pressure was kept to 2 bar using a backpressure regulator. After finishing the reaction, the synthesis of the modification polymerization initiator was secured by the change of the molecular weights of the compound represented by Formula 1-11 and the finally obtained material by molecular analysis. The molecular weight of the compound represented by Formula 1-11 was 321 g/mol, and the molecular weight of the finally obtained material, i.e., the modification polymerization initiator was 378 g/mol. In this case, the molecular weight of the modification polymerization initiator represented the molecular weight obtained by substituting Li with H. The molecular weight analysis was conducted by the same method as in Example 1.

[Formula 1-11]

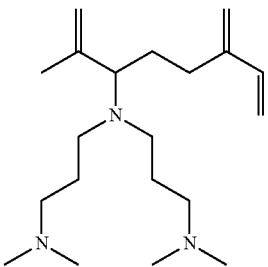

Example 4

Two of 2 L, vacuum dried stainless steel pressure containers were prepared. To the first pressure container, 1900 g of hexane, 253 g of a compound represented by Formula 1-7 below, and 124 g of tetramethylethylenediamine were injected to prepare a first reaction solution. At the same time, to the second pressure container, 385 g of 2.5 M n-butyllithium (in hexane) in a liquid phase and 2600 g of hexane were injected to prepare a second reaction solution. In this case, the molar ratio of the compound represented by Formula 1-7, n-butyllithium and tetramethylethylenediamine was 1:1:1. The pressure of each pressure container was kept to 5 bar, and the first reaction solution was injected via a first continuous channel in an injection rate of 1.0 g/min and the second reaction solution was injected via a second continuous channel in an injection rate of 1.0 g/min, respectively, into a continuous reactor using a mass flowmeter. In this case, the temperature of the continuous reactor was kept to 25° C., and the internal pressure was kept to 2 bar using a backpressure regulator. After finishing the reaction, the synthesis of the modification polymerization initiator was secured by the change of the molecular weights of the compound represented by Formula 1-7 and the finally obtained material by molecular analysis. The molecular weight of the compound represented by Formula 1-7 was 237 g/mol, and the molecular weight of the finally obtained material, i.e., the modification polymerization initiator was 295 g/mol. In this case, the molecular weight of the modification polymerization initiator represented the molecular weight obtained by substituting Li with H. The molecular weight analysis was conducted by the same method as in Example 1.

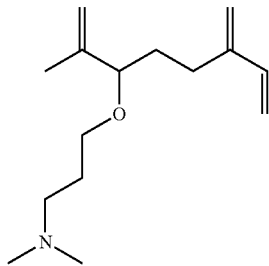

[Formula 1-7]

Examples 5 to 8

A modified conjugated diene-based polymer having a functional group derived from a modification polymerization initiator was prepared using each of the modification polymerization initiators prepared in Examples 1 to Example 4.

Particularly, to a 20 L autoclave reactor, in the presence of each of the modification polymerization initiators prepared in Example 1 to Example 4, 21 g of styrene, 58 g of 1,3-butadiene, 581 g of anhydrous n-hexane were added, and polymerization was performed while elevating the temperature from 50° C. to 80° C. until a polymerization conversion ratio reached 99%. Then, 1,3-butadiene was injected for capping the terminal of a polymer, and 14 g of a solution in which 30 wt % of Wingstay K antioxidant was dissolved in hexane was added thereto. The polymer thus obtained was added to hot water heated using steam and stirred to remove solvents, followed by roll drying to remove remaining solvents and water to prepare a modified styrene-butadiene copolymer.

NMR analysis was conducted for each copolymer thus prepared, and the presence of a nitrogen atom which was a functional group derived from a modification initiator in a copolymer chain was secured.

The invention claimed is:

1. A method for preparing a modification polymerization initiator, the method comprising:
reacting a compound represented by the following Formula 1 and a compound represented by the following Formula 2,
wherein the reaction is performed in a continuous reactor comprising a first continuous channel and a second continuous channel, and
prior to performing the reaction, the compound represented by Formula 1 is injected into the continuous reactor via the first continuous channel, and the compound represented by Formula 2 is injected into the continuous reactor via the second continuous channel:

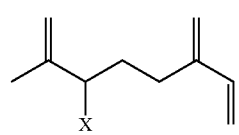

[Formula 1]

in Formula 1,
X is $-NR_aR_b$, $-OR_c$, or $-SR_d$, and
$R_a$ to $R_d$ are each independently an alkyl group of 1 to 30 carbon atoms, an alkenyl group of 2 to 30 carbon atoms, an alkynyl group of 2 to 30 carbon atoms, a cycloalkyl group of 3 to 30 carbon atoms, an aryl group of 6 to 30 carbon atoms, a heteroalkyl group of 1 to 30 carbon atoms, a heteroalkenyl group of 2 to 30 carbon atoms, a heteroalkynyl group of 2 to 30 carbon atoms, a heterocycloalkyl group of 2 to 30 carbon atoms, or a heteroaryl group of 3 to 30 carbon atoms, where each of $R_a$ to $R_d$ is independently unsubstituted or substituted with a substituent comprising one or more heteroatoms selected from N, O, S, Si and F atoms, and $R_a$ and $R_b$ are optionally connected with each other to form an aliphatic hydrocarbon ring of 5 to 20 carbon atoms, an aromatic hydrocarbon ring of 6 to 20 carbon atoms, or a heterocycle of 3 to 20 carbon atoms, each of which is independently unsubstituted or substituted with an alkyl group of 1 to 30 carbon atoms, $$M-R_1 \qquad \text{[Formula 2]}$$

in Formula 2,
M is an alkali metal, and
$R_1$ is hydrogen, an alkyl group of 1 to 30 carbon atoms, an alkenyl group of 2 to 30 carbon atoms, an alkynyl group of 2 to 30 carbon atoms, a cycloalkyl group of 5 to 30 carbon atoms, or an aryl group of 6 to 30 carbon atoms.

2. The method for preparing a modification polymerization initiator according to claim 1, wherein
in Formula 1,
X is $-NR_aR_b$, $-OR_c$, or $-SR_d$, and
$R_a$ to $R_g$ are each independently an alkyl group of 1 to 20 carbon atoms, an alkenyl group of 2 to 20 carbon atoms, an alkynyl group of 2 to 20 carbon atoms, a cycloalkyl group of 3 to 20 carbon atoms, an aryl group of 6 to 20 carbon atoms, a heteroalkyl group of 1 to 20 carbon atoms, a heteroalkenyl group of 2 to 20 carbon atoms, a heteroalkynyl group of 2 to 20 carbon atoms, a heterocycloalkyl group of 2 to 20 carbon atoms, or a heteroaryl group of 3 to 20 carbon atoms, where each of $R_a$ to $R_d$ is independently unsubstituted or substituted with a substituent comprising one or more heteroatoms selected from N, O, S, Si and F atoms, and $R_a$ and $R_b$ are optionally connected with each other to form an aliphatic hydrocarbon ring of 5 to 20 carbon atoms, an aromatic hydrocarbon ring of 6 to 20 carbon atoms, or a heterocycle of 3 to 20 carbon atoms, each of which is independently unsubstituted or substituted with an alkyl group of 1 to 20 carbon atoms, and
in Formula 2,
$R_1$ is hydrogen, alkyl group of 1 to 10 carbon atoms, an alkenyl group of 2 to 10 carbon atoms, an alkynyl group of 2 to 10 carbon atoms, a cycloalkyl group of 5 to 10 carbon atoms, or an aryl group of 6 to 10 carbon atoms.

3. The method for preparing a modification polymerization initiator according to claim 1, wherein
in Formula 1,
X is one selected from substituents represented by the following Formula 1a to Formula 1c:

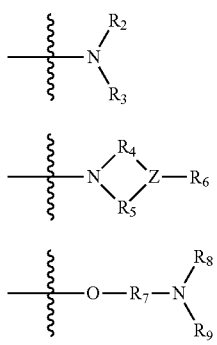

in Formula 1a to Formula 1c,
$R_2$, $R_3$, $R_6$, $R_8$ and $R_9$ are each independently an alkyl group of 1 to 10 carbon atoms, an alkenyl group of 2 to 10 carbon atoms, an alkynyl group of 2 to 10 carbon atoms, a cycloalkyl group of 3 to 10 carbon atoms, an aryl group of 6 to 10 carbon atoms, a heteroalkyl group of 1 to 10 carbon atoms, a heteroalkenyl group of 2 to 10 carbon atoms, a heteroalkynyl group of 2 to 10 carbon atoms, a heterocycloalkyl group of 3 to 10 carbon atoms, or a heteroaryl group of 3 to 10 carbon atoms, where $R_2$ and $R_3$, and $R_8$ and $R_9$ each are optionally connected with each other to form an aliphatic hydrocarbon ring of 5 to 20 carbon atoms, or an aromatic hydrocarbon ring of 6 to 20 carbon atoms, and each of $R_2$, $R_3$, $R_6$, $R_8$ and $R_9$ is indenpendently unsubstituted or substituted with a substituent comprising one or more heteroatoms selected from N, O or S atoms,
$R_4$, $R_5$ and $R_7$ are each independently an alkylene group of 1 to 10 carbon atoms, where the alkylene group is unsubstituted or substituted with an alkyl group of 1 to 10 carbon atoms, a cycloalkyl group of 5 to 10 carbon atoms, an aryl group of 6 to 10 carbon atoms, a heteroatom selected from N or O atoms or with a substituent comprising the heteroatom, and
Z is one selected from N, O and S atoms, where if Z is O or S, $R_6$ is not present.

4. The method for preparing a modification polymerization initiator according to claim 1, wherein the compound represented by Formula 1 and the compound represented by Formula 2 are reacted in a molar ratio of 1:0.01 to 5.

5. The method for preparing a modification polymerization initiator according to claim 1, wherein the reaction is performed in a temperature range of −20° C. to 100° C. and under pressure conditions of 1 bar to 10 bar.

6. The method for preparing a modification polymerization initiator according to claim 1, wherein the reaction is performed by using a polar additive.

7. The method for preparing a modification polymerization initiator according to claim 6, wherein the polar additive comprises one or more selected from the group consisting of tetrahydrofuran, ditetrahydrofurylpropane, diethyl ether, cycloamyl ether, dipropyl ether, ethylene dimethyl ether, ethylene diethyl ether, diethyl glycol, dimethyl ether, tert-butoxyethoxyethane, bis(3-dimethylaminoethyl) ether, (dimethylaminoethyl) ethyl ether, trimethylamine, triethylamine, tripropylamine, and tetramethylethylenediamine.

8. The method for preparing a modification polymerization initiator according to claim 1, wherein the compound represented by Formula 1 is a compound represented by the following Formula 1-1 to Formula 1-11:

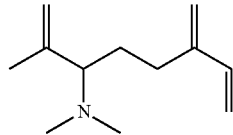

[Formula 1-1]

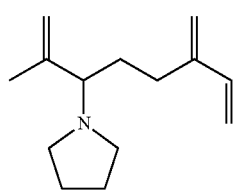

[Formula 1-2]

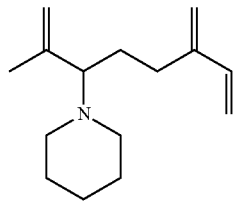

[Formula 1-3]

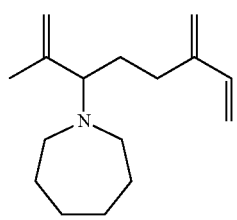

[Formula 1-4]

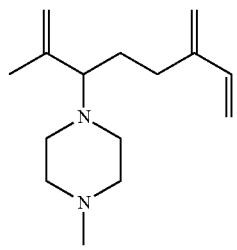

[Formula 1-5]

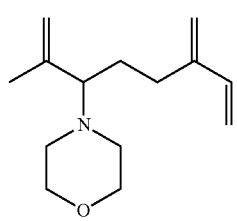

[Formula 1-6]

[Formula 1-7]

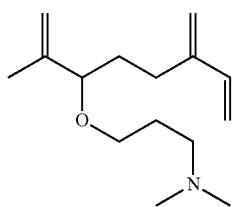

[Formula 1-8]

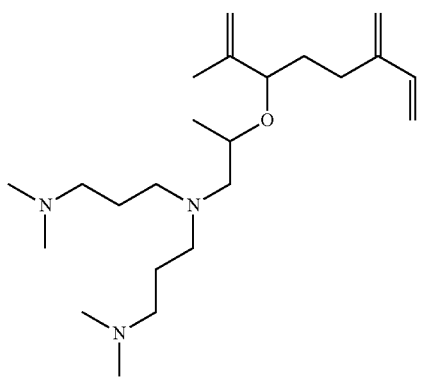

[Formula 1-9]

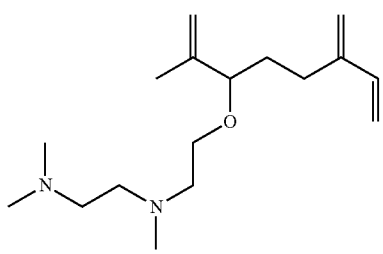

[Formula 1-10]

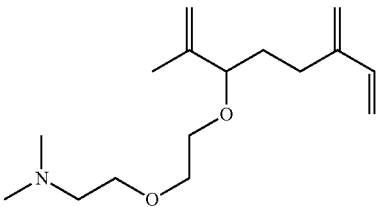

[Formula 1-11]

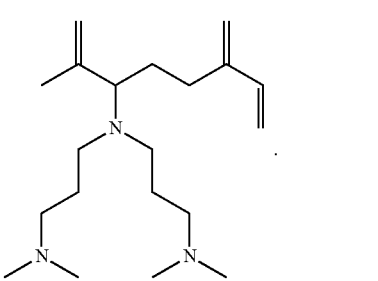

9. The method for preparing a modification polymerization initiator according to claim 1, wherein the compound represented by Formula 1 is prepared by reacting myrcene with a functional group compound.

10. The method for preparing a modification polymerization initiator according to claim 1, wherein an injection rate of the compound represented by Formula 1 into the continuous reactor via the first continuous channel is from 0.1 g/min to 1,000 g/min, and an injection rate of the compound represented by Formula 2 into the continuous reactor via the second continuous channel is from 0.1 g/min to 1,000 g/min.

11. The method for preparing a modification polymerization initiator according to claim 6, wherein the polar additive is included in an amount of 0.1 mol to 10 mol based on 1 mol of the compound represented by Formula 1.

* * * * *